(No Model.)

A. C. FRENCH.
SNATCH BLOCK.

No. 481,020. Patented Aug. 16, 1892.

WITNESSES:
J. A. Bergstrom
E. M. Clark

INVENTOR
Adams C. French
BY Munn & Co
ATTORNEYS

UNITED STATES PATENT OFFICE.

ADAMS C. FRENCH, OF SEATTLE, WASHINGTON.

SNATCH-BLOCK.

SPECIFICATION forming part of Letters Patent No. 481,020, dated August 16, 1892.

Application filed November 7, 1891. Serial No. 411,125. (No model.)

*To all whom it may concern:*

Be it known that I, ADAMS C. FRENCH, of Seattle, in the county of King and State of Washington, have invented a new and Improved Snatch-Block, of which the following is a full, clear, and exact description.

My invention relates to improvements in snatch-blocks such as are used for hoisting purposes; and the object of my invention is to produce a simple, efficient, cheap, and durable snatch-block which may be readily detached from its hook and which is connected with its hook in such a manner that the frame cannot spread.

To this end my invention consists in a snatch-block, the construction of which will be hereinafter described and claimed.

Reference is to be had to the accompanying drawings, forming a part of this specification, in which similar figures of reference indicate corresponding parts in all the views.

Figure 1:
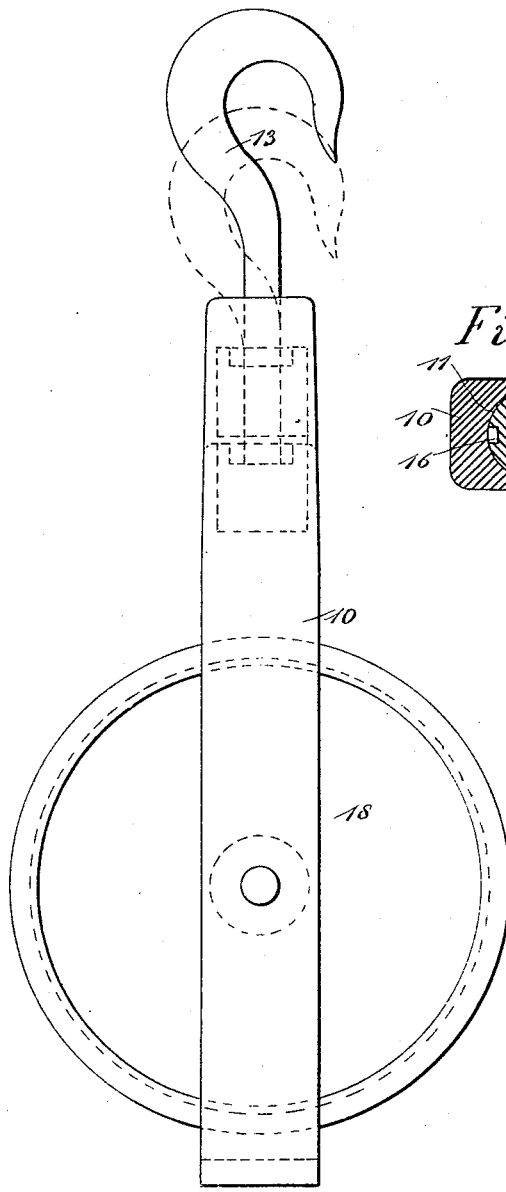
Figure 3:
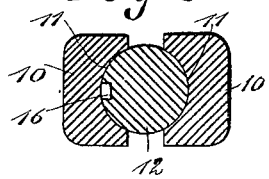
Figure 2:
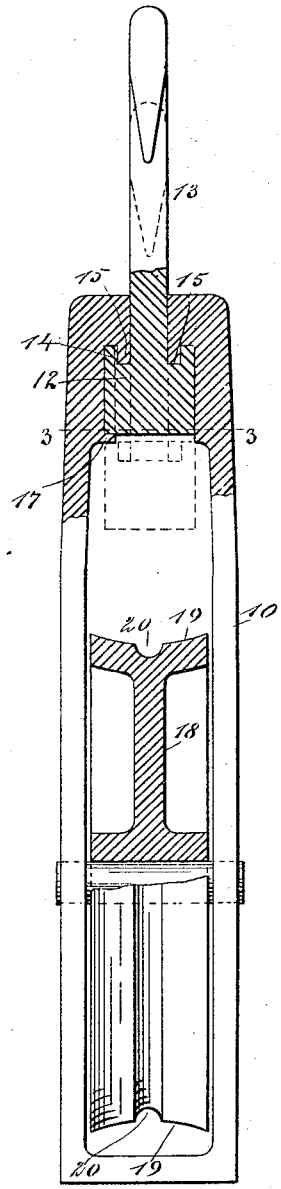

Figure 1 is a side elevation of the snatch-block embodying my invention. Fig. 2 is a front elevation of the same with parts in section, and Fig. 3 is a sectional plan through the frame and hook-head on the line 3 3 in Fig. 2.

The block is provided with a substantially-U-shaped frame 10, in which the sheave-pulley is pivoted, and the side pieces or arms of the frame are concaved at their inner upper ends, as shown at 11 in Fig. 3, so as to form an enlarged socket to receive the cylindrical head 12 of the hook 13, and the upper ends of the side pieces or arms 10 are far enough apart so that the shank of the hook may be passed between them when the head is in the space below the socket, as shown in dotted lines, Fig. 2, the head of the hook being of less diameter than the space below the socket and of greater diameter than that above it.

The head 12 of the hook has an annular groove 14 in its top surface and extending around the shank of the hook, which groove receives the spurs 15 at the upper ends of the side pieces or arms of the frame 10, and as the spurs are locked into the groove it will be seen that the frame cannot spread.

The cylindrical head 12 is provided on one side with a longitudinal keyway 16, which fits a projecting lug 17 on one of the side pieces or arms of the frame 10, the lug being located below the concaved portion of the arm, as best shown in Fig. 2. It will thus be seen that by placing the shank of the hook between the upper ends of the arm and turning the cylindrical head so that the keyway 16 will register with the lug 17 the hook may be raised, so that the head will slip into the concaved portions of the arms, and then by turning the hook the keyway will be brought out of alignment with the lug 17, so that the head 12 will remain in place and the frame 10 will be pivotally suspended upon it. The sheave-pulley 18, which is pivoted in the frame, is provided with a concaved face 19, having a central recess 20 of greater concavity, and this central recess is adapted to receive a wire cable, which may run over the pulley in the usual way.

From the foregoing description it will be seen that the snatch-block is very strong, that it is very simple in construction, and that the parts may be easily detached or united.

Having thus fully described my invention, I claim as new and desire to secure by Letters Patent—

1. A snatch-block comprising a frame having its sides or arms separated at their upper ends and concaved on their inner faces to form an enlarged socket and a removable hook having a head fitting within said socket of greater diameter than the space separating the sides or arms above it and of less diameter than the space below the same, the hook being thus adapted to be removed or inserted by passing its shank laterally between the separated or spaced upper ends of the frame when its head is in the space below its socket, substantially as set forth.

2. A snatch-block comprising a frame having its sides or arms separated at their upper ends and concaved on their inner faces to form an enlarged socket, and a removable hook having a head turning freely within said socket of greater diameter than the space above the socket and of less diameter than the space below it, the hook being thus adapted to be removed or inserted by passing its shank laterally between the spaced or separated upper ends of the frame when the head is within the space below its socket, and a fastening device securing the head against accidental displacement from its socket, substantially as described.

3. The combination, with the block-frame having its side arms separated and concaved at the top, one of said side arms having a projecting lug at the bottom of the concaved portion, of a hook having a cylindrical head to fit the concaved portions of the arm and having a keyway in the head adapted to pass over the lug on the frame, substantially as described.

4. The combination, with the frame having separated concaved upper ends, said ends having depending spurs near the top and one of them having a projecting lug at the bottom of the concaved portion, of a detachable hook having a cylindrical head to fit the concaved portions of the arms, said head having an annular groove at the top to receive the spurs of the frame, and a longitudinal keyway adapted to register with the lug on the frame, substantially as described.

ADAMS C. FRENCH.

Witnesses:
ABBIE A. FRENCH,
G. A. FRENCH.